UNITED STATES PATENT OFFICE.

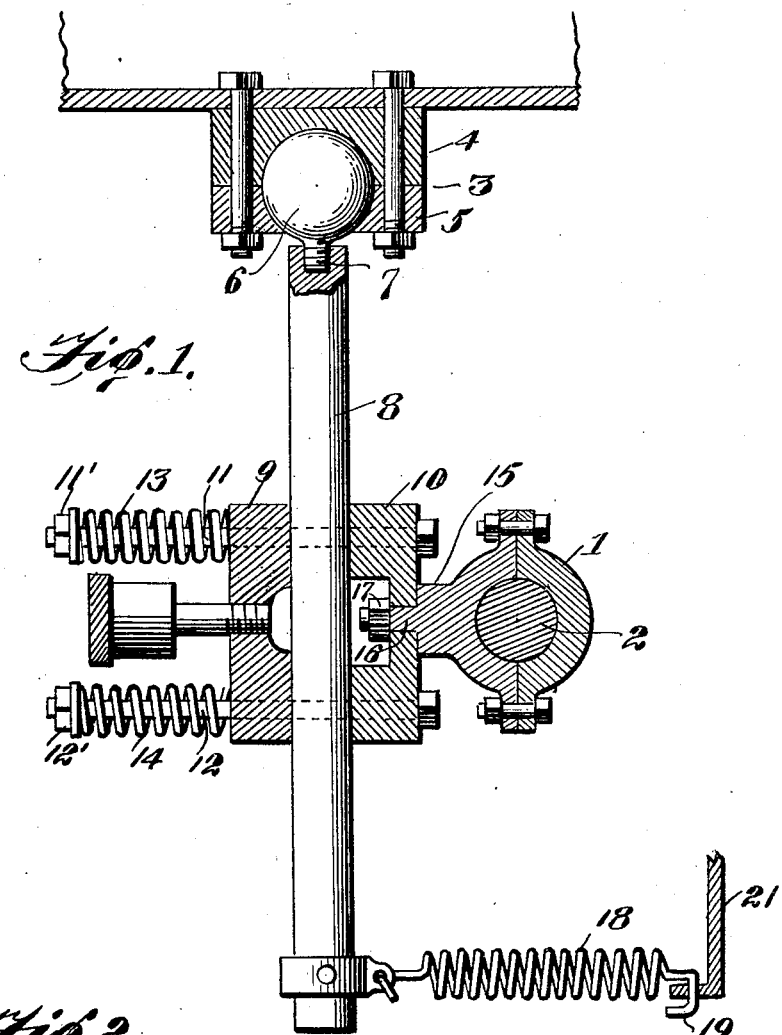
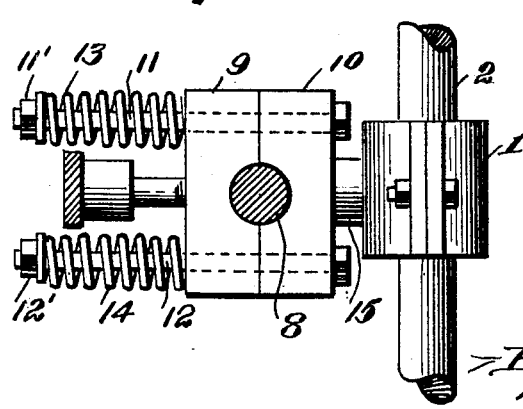

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,324,373.   Specification of Letters Patent.   Patented Dec. 9, 1919.

Application filed July 15, 1918. Serial No. 245,007.

*To all whom it may concern:*

Be it known that we, GEORGE M. BICKNELL and HUGH H. C. WEED, citizens of the United States, and residing at Detroit, in the county of Wayne, Michigan, and at St. Louis, in the county of St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subjected to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of our invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement in all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view, partly in section, illustrating the invention applied to a drive shaft, Fig. 2 is an elevation in detail; and Fig. 3 is a detail of the spring connection.

The invention comprises preferably a split bearing 1, adapted to surround the shaft 2.

Fixed to any convenient part of an automobile, such as a cross-member, is a socket member 3, here shown as comprised of two plates 4 and 5, shaped to receive a metallic ball 6, provided with a screw threaded shank 7. The plates 4 and 5 are preferably secured to the cross-member by bolts, as shown in Fig. 1.

Secured to the shank 7 is a bar 8, preferably provided with an inwardly screw threaded socket to receive said shank. The disposition of the several elements is such that the bar 8, when connected as described, will assume a position adjacent the bearing 1.

Surrounding the bar 8 is a split collar comprised of two plates 9 and 10 having interior faces grooved to effect a sliding contact with the said bar. Said plates are provided with apertures through which extend bolts 11 and 12. As shown in Fig. 1, the bolts extend outwardly beyond the plate 9, and are surrounded by compression springs 13, 14 respectively, which springs exert their resiliency to cause the plates 9 and 10 to clamp the bar 8. Adjusting nuts 11' and 12' are fitted to the outer ends of the bolts 11 and 12 respectively, whereby the clamping action on the plates may be regulated, as will be understood.

The bearing 1 is provided with a shank 15, having a projection 16 extending through the adjacent face of the plate 10, the end of said projection being screw threaded to receive a nut 17.

A coiled tension spring 18 is connected in any convenient manner to the lower portion of the bar 8. The other end of this spring is provided with a hook 19 which extends through a slot 20 in a bracket 21, fastened to any convenient part of the automobile. The spring is so positioned that its resiliency is directed to pull the bar 8 toward the bearing 1. It therefore follows that any lateral movement of the bar 8 away from the shaft (or to the left, in the embodiment shown in the drawing) will be resisted by the spring. A movement of the bar to the right will not be resisted by the spring, since the hook 19 will ride along the slot 20, which slot should be made of sufficient length to prevent any compression of, and consequent resistance by, the spring 18.

The operation of the device is clear. Through the ball and socket connection of the bar 8, it is rendered free to swing longitudinally of the shaft, and also laterally thereof. But the spring 19 resists lateral movement of the bar to the left, and permits such movement in an opposite direction. Vertical movement of the bar 8 is not possible, and any vertical movement of the bearing causes the collar formed by the plates 9 and 10 to slide along the bar 8 against the frictional resistance imposed by the springs 13 and 14.

From the foregoing it will be seen that we have devised means for imposing a yielding resistance to vertical movement of the shaft or bearing; separate means for imposing unequal yielding resistance to lateral movement of the shaft in opposite directions, and at the same time allowing for any longitudinal movement of the shaft at all times.

It is obvious that in actual practice of the invention lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is to be understood that, while we have shown a member mounted to assume a vertical position adjacent the shaft, the member might just as well be mounted to extend laterally above or below the shaft. In this event, the lateral movement of the member, the bearing, or the shaft, as herein described, both in the specification and claims, might properly be termed a vertical movement, and vice-versa. The appended claims cover this mechanical equivalent.

What we claim is:

1. A device of the character described comprising, in combination with a rotatable shaft, a floatable bearing engaging the shaft, means for yieldingly resisting any vertical movement of the bearing, and means for imposing resistance to lateral movement thereof, while permitting longitudinal movement of the shaft and bearing.

2. A device of the character described comprising, in combination with a rotatable shaft, a floatable bearing engaging the shaft, a swinging element having its free portion adjacent the bearing, means on the element for yieldingly resisting vertical movement of the bearing, and supplemental means for yieldingly opposing resistance to lateral movement of the bearing, both said means permitting longitudinal movement of the bearing and shaft.

In testimony whereof we affix our signatures.

GEORGE M. BICKNELL.
HUGH H. C. WEED.